United States Patent [19]

Satoh

[11] Patent Number: 4,596,025
[45] Date of Patent: Jun. 17, 1986

[54] TIMING SYNCHRONIZATION CIRCUIT

[75] Inventor: Takane Satoh, Kanagawa, Japan

[73] Assignee: Fuji Xerox Co., Ltd., Tokyo, Japan

[21] Appl. No.: 518,566

[22] Filed: Jul. 29, 1983

[30] Foreign Application Priority Data

Jul. 29, 1982 [JP] Japan ................................ 57-131,148

[51] Int. Cl.[4] .............................................. H04L 7/00
[52] U.S. Cl. ...................................... 375/107; 370/85; 370/100
[58] Field of Search .................. 375/106, 107; 370/85, 370/104, 100, 105; 328/63, 72; 371/42, 47

[56] References Cited

U.S. PATENT DOCUMENTS

| 3,641,274 | 2/1972 | Sasaki et al. | 370/104 |
| 3,772,475 | 11/1973 | Loffreda | 370/104 |
| 3,813,496 | 5/1974 | Maillet | 370/104 |
| 3,825,899 | 7/1974 | Haeberle et al. | 375/107 |
| 3,922,496 | 11/1975 | Gabbard et al. | 370/104 |
| 3,958,083 | 5/1976 | Hara et al. | 370/104 |
| 4,017,684 | 4/1977 | Kurihara et al. | 370/104 |
| 4,054,753 | 10/1977 | Kaul et al. | 370/104 |
| 4,271,505 | 6/1981 | Menot et al. | 370/85 |

Primary Examiner—Benedict V. Safourek
Assistant Examiner—Stephen Chin
Attorney, Agent, or Firm—Sughrue, Mion, Zinn, Macpeak and Seas

[57] ABSTRACT

A timing synchronization circuit for use in a multi-station communication system in which one station is a master station. The timing synchronization circuit within each station comprises a clock operating at a frequency nearly constant between the stations. The clock signal is frequency-divided to provide synchronization of the frames and blocks of the data being transmitted. The clock signal is reinitialized by a reset signal generated when a packet of data transmitted by the master station is received and recognized by the station by identifying code within the packet. The reinitialization accounts for the propagation delays relative to the master station.

8 Claims, 14 Drawing Figures

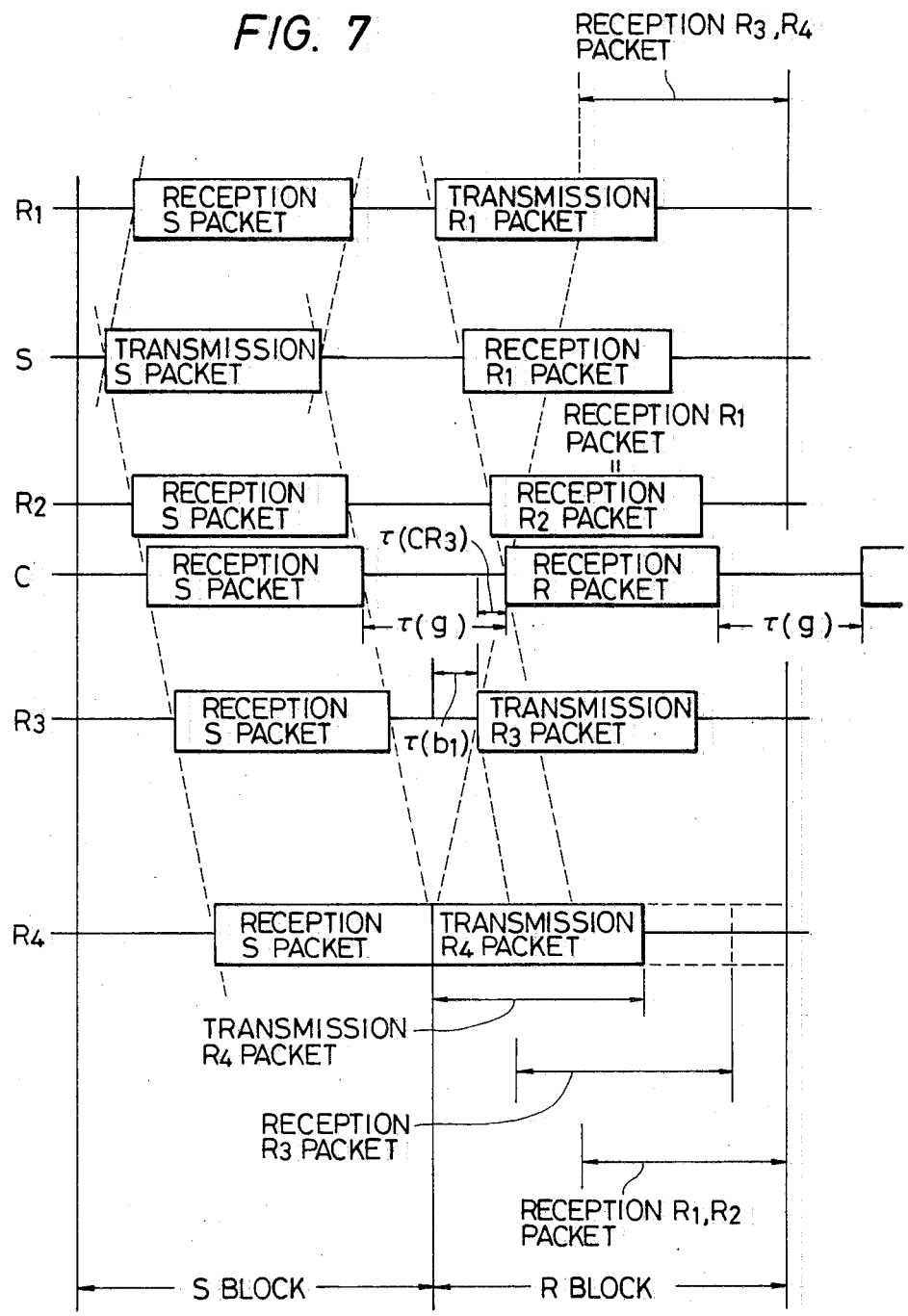

TIMING SYNCHRONIZATION CIRCUIT

BACKGROUND OF THE INVENTION

1. Field of the Invention

This invention relates to a timing synchronizing circuit for providing common system timing in a multi-station communication network which transmits and receives digital signals over a communication cable.

2. Background

Recently, communication devices and communication networks based on a data exchange system such as a packet exchange system have been greatly developed. In a coded transmission system in which digital signals are coded for transmission, the signal transmitting side and the signal receiving side should be timed for transmitting and receiving signals.

FIG. 1 shows the simplest transmission system. In the system, a transmitter 12 is connected to one end of a transmission path 11, to the other end of which a receiver 13 is connected. In this "point-to-point" transmission system also, it is desirable that synchronization such as bit synchronization or word synchronization is performed according to bit rate, in order to compensate for signal propagation delay times. In such a system, system timing can be established relatively readily.

FIG. 2 shows a multi-point transmission system. In the system, a plurality of terminal stations 15-1 through 15-N (N being an integer larger than one (1)) are connected to a common communication cable 14. If these stations generate clock frequencies which are substantially equal to one another, data communication can be performed among the stations without bit synchronization. One example of the above-described communication system is a "modified ethernet" system which is provided by modifying an "ethernet" system. In the modified ethernet system, a large segment (frame) which occurs periodically on the time axis is divided into a plurality of small segments (blocks), so that the stations can engage in packet communication in block units. In the system, the stations can equally utilize empty blocks. Furthermore, if a station is assigned a block, then it can use the same block in every frame. That is, the system is advantageous in that real time transmission is carried out.

FIG. 3 shows the frame format for signals in the modified ethernet. In FIG. 3 and other timing diagrams, time increases toward the left. A frame occurs periodically on the time axis, and consists of N blocks #1 through #N. Each block consists of the following bit trains $b_1$ through $b_9$ where;

- $b_1$: rear guard time
- $b_2$: preamble
- $b_3$: start flag
- $b_4$: address bits
- $b_5$: control bits
- $b_6$: data bits
- $b_7$: check bits
- $b_8$: end flag
- $b_9$: front guard time Note that the numbering of blocks and bit trains decreases with increasing time.

The bit trains $b_2$ through $b_5$, $b_7$ and $b_8$ are necessary for forming a packet, and are generally called "overhead bits" because they are additional bits to the desired data bits. The two bit trains $b_1$ and $b_9$ serve as "guard time". That is, the guard time is an empty bit train which is provided to prevent the difficulty that adjacent packets might overlap partially with each other because of delay time in propagation of packets over the coaxial cable 14. The rear guard time $b_1$ is to protect a packet occurring after it. The front guard time $b_9$ is to protect a packet occurring before it. The sum of the number of bits of the rear guard time $b_1$ and the number of bits of the front guard time $b_9$ will be represented by g bits, and a guard time ($b_1$ and $b_9$) by $\tau(g)$.

In the above-described communication system, when none of the stations transmit signals, each station can equally start transmitting a signal, which is framed as described above, at a completely independent time. A station which has first transmitted a signal onto the communication cable has the leadership of frame synchronization.

When frame synchronization has been established as described above, all the stations can monitor the states of signals transmitted over the communication cable. In each station, a subscriber device has a memory for indicating the assignment of the block in a frame, and each block is registered according to the received packet signals of the stations.

After frame synchronization has been established, in order for another station to transmit a packet signal, an empty block is selected according to the aforementioned memory, so that the station is assigned the empty block to transmit the packet signal.

In this operation, the timing at which the stations start transmitting the packet signals is essential. Referring to FIG. 4, it is assumed that a station C is located at the middle of a coaxial cable 18 which is laid between impedance matching terminators 16 and 17, and a station S which has transmitted a signal is located between one terminator 16 and the station C. In this case, the packet signal transmitted by the station S is received by other stations $R_1$ through $R_4$ at different times according to delay times of signal propagation over the intervening coaxial cable. Accordingly, if the stations transmit the packet signals carelessly, then the packet signals may collide with one another as they travel over the coaxial cable 18.

In order to prevent this difficulty, in the communication system the stations perform synchronously for block and/or frame, because even if clock signals are separately transmitted for bit synchronization or word snchronization, it is difficult for each station to adjust the variable signal propagation delay time between pairs of stations.

By way of example, the communication system called a "modified ethernet" system has been described. When multi-station transmission is carried out according to a communication system based on the technical concept of both frame and block, similarly it is necessary to establish frame synchronization or block synchronization. However, a circuit which can achieve the timing synchronization effectively and accurately has not been produced nor disclosed yet.

SUMMARY OF THE INVENTION

In view of the foregoing, an object of this invention is to provide a timing synchronizing circuit by which, in a multi-station communication network in which the clock frequencies of stations are substantially equal but in asynchronous relation, the stations can accurately establish frame synchronization and/or block synchronization.

According to the invention, in the multi-station communication network, the clock signal of each station is frequency-divided by a frequency divider to perform frame synchronization or block synchronization, and an initializing signal is provided to the frequency divider with the aid of a reset signal which is formed by detecting a packet signal which is transmitted from a reference station in the network.

BRIEF DESCRIPTION OF THE DRAWINGS

FIG. 7 is a timing chart showing the envelopes of transmitted or received packet signals at the taps of the stations shown in FIG. 4;

DETAILED DESCRIPTION OF THE PREFERRED EMBODIMENT

This invention will be described with reference to its preferred embodiment.

Figure 5:
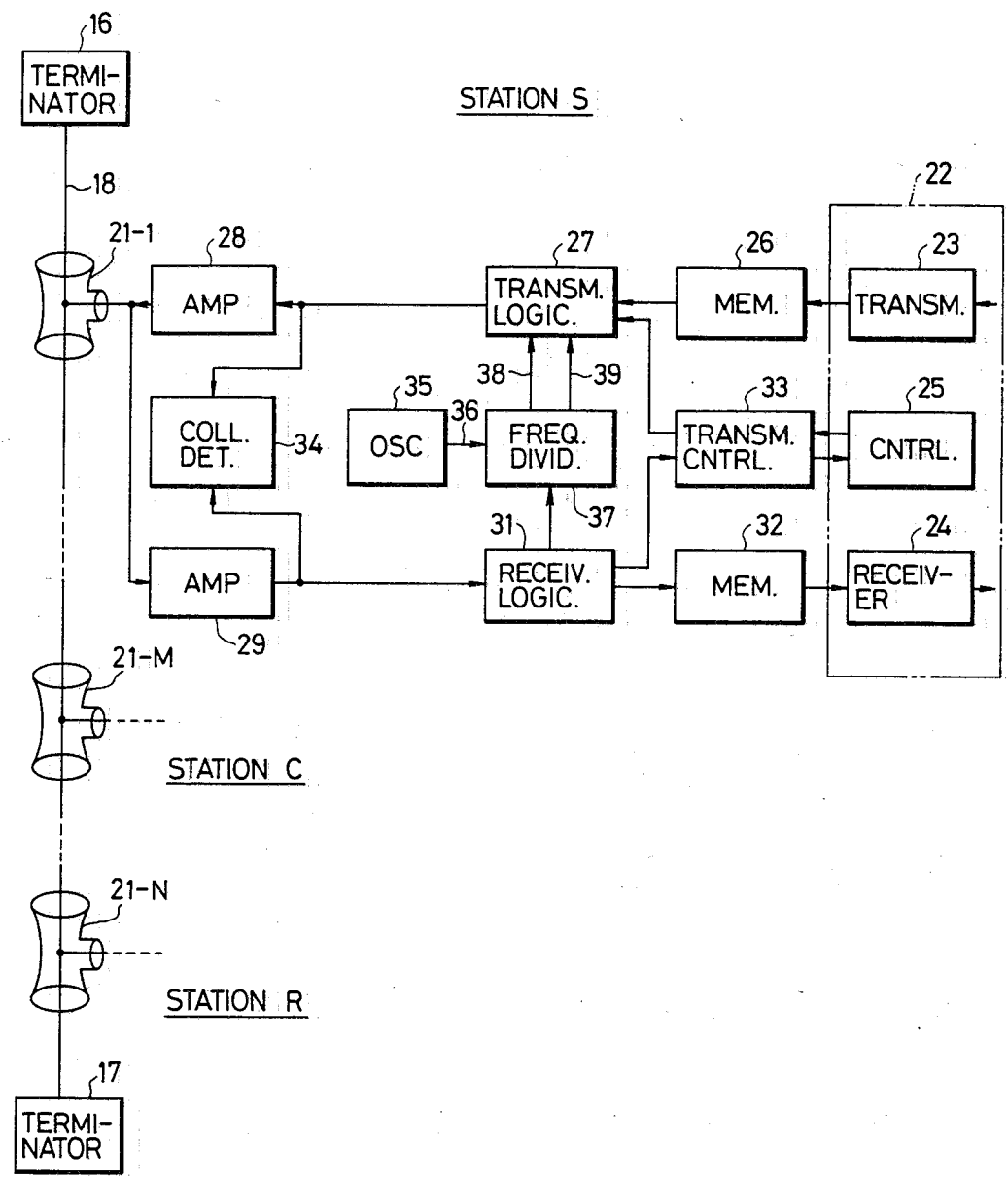
FIG. 5 is a block diagram outlining a communication system of an embodiment of the invention based on the modified ethernet.

FIG. 5 shows a communication system which is provided by applying the technical concept of the invention to the "modified ethernet".

In the communication system, a coaxial cable 18 which is used as a transmission path is connected between impedance matching terminators 16 and 17, each having a resistance equal to the characteristic impedance of the cable 18. A number of stations are connected through taps (or signal input/output points) 21-1 through 21-N to the coaxial cable 18. These stations are fundamentally the same in arrangement, and therefore only the essential circuit elements of one station S which is connected through the tap 21-1 to the coaxial cable 18 are shown in FIG. 5.

Each station has a subscriber device 22 provided with a computer and a telephone set. The subscriber device 22 comprises: a transmitter 23 or an encoder for transmitting digital signals of packet units to another station; a receiver 24 or a decoder for receiving digital signals of packet units from another station; and a terminal controller 25 for controlling a terminal. The output signal of the transmitter 23 is temporarily stored in a signal transmitting buffer memory 26, and is collectively read out at a predetermined time with the aid of a clock signal, the period of which determines the data transmission rate on the coaxial cable 18 which is the transmission medium.

The signals thus read out are converted into a predetermined packet signal by a signal transmitting logic circuit 27. The packet signal is applied through a signal transmitting buffer amplifier 28 and the tap 21-1 to the coaxial cable 18.

On the other hand, all the packet signals which are transmitted over the cable 18 are applied through the tap 21-1 to a signal receiving buffer amplifier 29. Out of the series of packet signals, any one intended for the station S is selected by a signal receiving logic circuit 31 and is thereupon temporarily stored in a signal receiving buffer memory 32. The signal thus stored is read sequentially by the receiver 24 with the aid of a predetermined clock signal, so that a reception output signal is obtained.

The signals are transmitted and received as described above. A transmission control circuit 33 controls the terminal controller 25 according to the signal which is applied to its own station and is received through the logic circuit 31, and controls the signal transmitting logic circuit 27 according to an instruction signal from the terminal controller 25. A collision detecting circuit 34 detects whether or not, when the first packet signal is transmitted in the block which is selected by its own station, the packet signal collides with the packet signal of another station.

Figure 6:
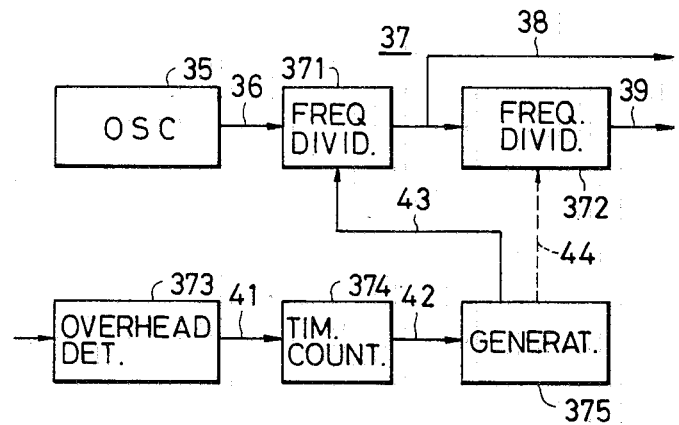
FIG. 6 is a block diagram showing the arrangement of a timing synchronizing circuit for the embodiment of FIG. 5.

Referring now to FIG. 6, a circuit for performing system timing synchronization in the communication system will be described. Each station has an oscillator 35, which outputs a clock signal 36 whose frequency is in an allowable predetermined range. The clock signal 36 is supplied to a frequency divider 37.

Figure 1:
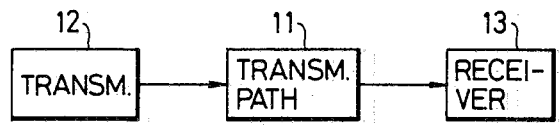
FIG. 1 is a block diagram showing the arrangement of a point-to-point transmission system in the prior art.
Figure 2:
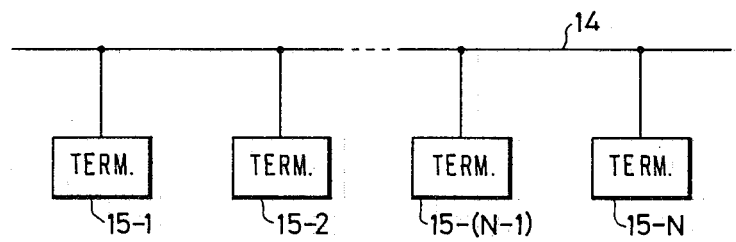
FIG. 2 is a block diagram showing the arrangement of a multi-point transmission system.
Figure 3:
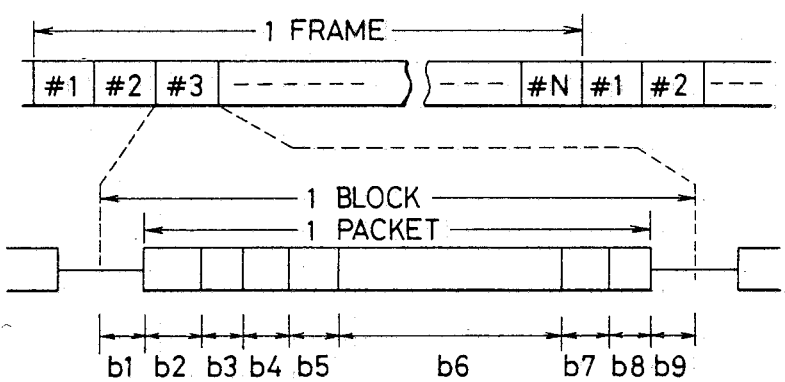
FIG. 3 is a timing diagram showing the arrangement of signals transmitted in a modified ethernet used in the invention.

FIG. 6 shows a part of the timing synchronizing circuit which performs system timing synchronization. The clock signal 36 is applied to a first frequency-dividing circuit 371 in the frequency divider 37. The first frequency-dividing circuit 371 subjects the clock signal 36 to B frequency division (where B is the number of bits forming a block) to form a block timing pulse 38, i.e. for every B clock signals 36 only one block timing pulse 38 is produced. The block timing pulse 38 is applied to the signal transmitting logic circuit 27 in order to synchronize the block timing. The block timing pulse 38 is further applied to a second frequency-dividing circuit 372. The circuit 372 subjects the pulse 38 to F frequency division (where F is the number of blocks forming a frame) to form a frame timing pulse 39. In the frame arrangement shown in FIG. 3, F=N. That is, whenever N blocks are counted, a frame timing pulse 39 is produced. The frame timing pulse 39 is supplied to the signal transmitting logic circuit 37 in order to synchronize the frame timing.

In the communication system, the stations perform timing adjustment on a system-wide basis according to the signal which is transmitted from the reference station (or the master station) as described before. For this purpose, the signal receiving logic circuit 31 shown in FIG. 5 supplies the received packet signals of the stations to an overhead detector 373. The overhead detector 373 compares the received packet against an overhead bit arrangement, to detect the packet signal of the master station. In the case where the packet signal of the master station is detected, the detector 373 outputs a detection signal 41 when its preamble $b_2$ has been received. The detection signal 41 is applied to a timing counter 374. The counter 374 has been set to a predetermined value to be described later. Upon reception of the detection signal 41, the counter 374 counts to the end of the front guard time $\tau(b_9)$ and outputs a time counting completion signal 42 at this instant which is then applied to a reset signal generator 375. With the timing that the signal 42 provides to the generator 375, the generator 375 outputs a first reset signal 43. The signal 43 is applied to the first frequency-dividing circuit 371 to reset the dividing circuit 371, whereby the time lag of transmission is corrected. If the clock signal 36 provides a frequency error of the order of several bits at most per frame, then the stations can establish system timing with sufficiently high accuracy. When the master station is replaced during communication, sometimes control is made as if the packet signal of the new master station were transmitted with the first block #1 of a frame. In the communication system in which the block number reference is changed as described above, the frame start point should be determined by referring to the master station. In such a communication system, a second reset signal 44 is produced with the same timing with which that the first reset signal 43 is produced, and the signal 44 thus produced is applied to the second frequency dividing circuit 372 to reset the latter 372.

Figure 4:
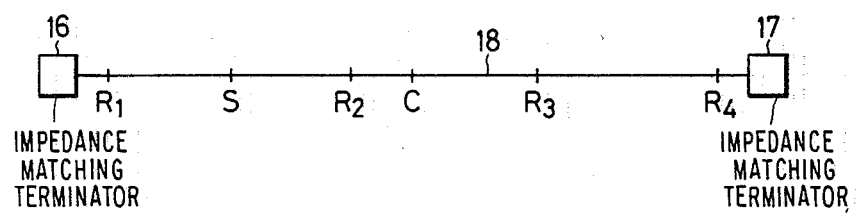
FIG. 4 is an interconnection diagram showing the positions of stations on a coaxial cable.

Problems involved in the circuit elements of the above-described timing synchronizing circuit will be specifically described. Among the times counted by the timing counter 374, the front guard time $\tau(b_9)$ depends on the station; that is, different stations have different front guard times. Adjustment of the front guard times will be described. In the communication system, in order to prevent the occurrence of the problem that the packet signals of the stations overlap in adjacent blocks, the synchronization of system timing is carried out by utilization of the above-described concept of guard time $\tau(g)$. That is, in the communication system, the guard time $\tau(g)$ is set to at least twice the signal propagation delay time which occurs between the central station C shown in FIG. 4, which is selected as the positional reference, and the furthest station from the central station. The packet signals of the stations are so transmitted that the packet signals arrive at equal intervals at the signal receiving point of the station C.

This will be described in more detail with reference to FIG. 7 which shows the timing of transmitted and received packets. It is assumed that the station S has transmitted its packet signal and the stations R1 through R4 are attempting to transmit packet signals. In this case, the stations R1 through R4 determine packet transmitting timing so that the reference station C starts receiving the packet signals from stations R1 though R4 one guard time after the station C has accomplished reception of the transmission packet of the station S, here labelled as the "transmission S packet".

In order to determine the signal transmitting timing as described above, upon reception of a packet signal transmitted over the coaxial cable each station detects from the packet's address bits that the packet signal of the station S has been received, here labelled "reception S packet" at its various reception stations. The station obtains the time of ending of the reception S packet at the signal receiving point of the station C from a knowledge of its own positional relation with the station C which is employed as the positional reference and the effect of this separation on the signal propagation delay time. This ending time is later than those of the reception S packet at the stations R1 and R2 and earlier than those of the reception S packet at the stations R3 and R4 as shown in FIG. 7.

When the stations R1 through R4 obtain the ending time of the reception S packet using station C as the reference, one of these stations which wants to transmit a packet signal starts transmission of the packet signal ("transmission R packet") at a time earlier by the signal propagation delay time occurring between the transmitting station and the station C than the aforementioned ending time. Thus the reference station C begins to receive the packet labelled "reception R packet" a guard time period $\tau(g)$ later than the ending time of the S packet ending time.

The above-described adjustment of signal transmission timing is carried out with frame synchronization and block synchronization established at each station. For instance, at the station R3 which is separated from station S by station C, the timing counter 374 is preset so that the second block #2 starts from the time instant which is later by the front guard time $\tau(b_9)$ than the reception S packet ending time, this guard time being calculated according to the following expression (1):

$$\tau(b_9) = \tau(g)/2 - \tau(CR3) \quad (1)$$

where $\tau(CR3)$ is the signal propagation delay time occurring between the station C and the station R3.

For the station R2 located between the stations S and C, the front guard time $\tau(b_9)$ is:

$$\tau(b_9) = \tau(g)/2 + \tau(CR2) \quad (2)$$

where $\tau(CR2)$ is the signal propagation delay time occurring between the station C and the station R2.

For the station R1 which is separated from station C by station S, the front guard time $\tau(b_9)$ is as follows:

$$\tau(b_9) = \tau(g)/2 + \tau(SC) - \tau(SR1) \quad (3)$$

where $\tau(SC)$ is the signal propagation delay time between the stations S and C, and $\tau(SR1)$ is the signal propagation delay time between the stations S and R1.

Thus, in this communication system, the time interval which elapses from the time that the packet signal arrives from the station which has the leadership of frame synchronization until the next possible timing for transmission occurs, is calculated from the above-described expressions (1), (2) or (3) for the front guard time $\tau(b_9)$ or according to other methods. The timing counters 374 of the stations are individually adjusted accordingly. Thus, the stations can establish system timing with high accuracy.

Figure 8:
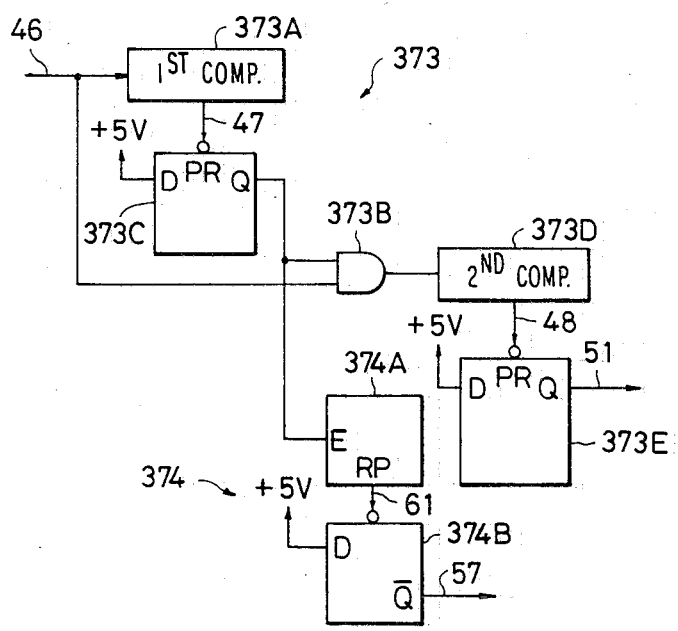
FIG. 8 is a block diagram showing in detail a part of an overhead detector and a part of a timing counter.

Now, how each stations detects a packet number from the master station will be described. FIG. 8 shows in more detail in block diagram form a part of the overhead detector 373 and a part of the timing counter 374 which output a master signal when a packet from the master station has been detected. Reception data 46 received in a packet mode is applied to a first comparator 373A in the overhead detector 373 and to one input terminal of a 2-input AND circuit 373B. The first comparator 373A operates to detect the preamble $b_2$ of the reception data 46. In the communication system, the preambles $b_2$ of packet signals transmitted by the stations have a common pattern. Accordingly, the first comparator 373A subjects supplied date to comparison for every bit, to identify the preamble $b_2$.

When the preamble $b_2$ is identified, the first comparator 373A outputs a coincidence signal 47 representative of the coincidence of the data. The signal 47 is supplied to a first flip-flop circuit 373C by which it is set. The output terminal Q of the flip-flop circuit 373C is connected to the other input terminal of the AND circuit 373B. Therefore, with the Q-output and the flip-flop 373C remaining high, the AND circuit 373B is opened to the data on its other input, so that reception data 46 transmitted thereafter is supplied to a second comparator 373D, whereby the comparator 373D subjects the start flag $b_3$ to comparison. The start flag $b_3$ is made up of a particular bit train (being all "0" bits for instance) to identify the packet signal of the master station. The second comparator 373D subjects the start flag to comparison for every bit, and it outputs a coincidence signal 48 at the occurrence of the bit train of the master station. The signal 48 is applied to a second flip-flop circuit 373E by which it is set. As a result, a high level master signal is provided at the output terminal Q of the circuit 373E. When the master station is replaced by another station, the start flag of the new master station becomes the aforementioned particular bit train. Thus, the stations can identify the master station accurately at all times.

A circuit for giving priority to a reset signal, provided when the packet signal of the master station is detected, will be described. Since all the stations (not just the master station) have their own oscillators 35, they can be classified with respect to the master station according to the following grouping:

(1) In the case where the frequency of the clock signal 36 in a station is lower than that of the clock signal of the master station; i.e., the phase lags, the station belongs to a first group.

(2) In the case where the frequency of the clock signal 36 in a station is higher than that of the clock signal of the master station; i.e., the phase leads, the station belongs to a second group.

Figure 9:
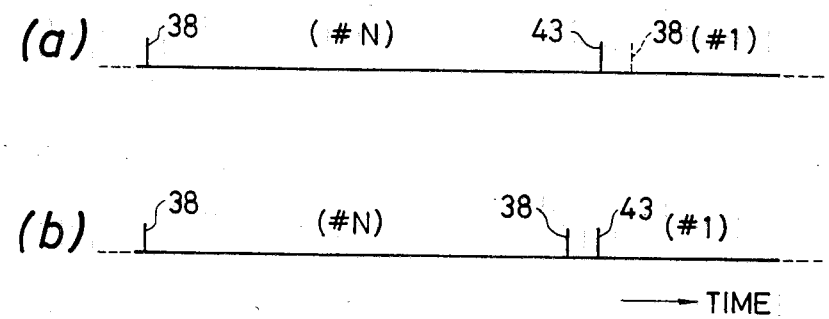
FIG. 9 is a timing chart showing relations between block timing pulses and the first reset signal in a station in a first group in trace (a) and in a station in a second group in trace (b)

In the case of a station in the first group, as shown in trace (a) of the timing diagram of FIG. 9, the first reset signal 43 is produced before the block timing pulse 38 that indicates the border between the N-th block #N and the first block #1 after the clock has been synchronized. Accordingly, no problem is involved to establish system timing.

On the other hand, in the case of a station in the second group, as shown in trace (b) of FIG. 9, the first reset signal 43 occurs after the block timing pulse 38 that indicates the border between the N-th block #N and the first block #1. Accordingly, the start point of the first block #1 is not fixed with a properly synchronized clock.

Figure 10:
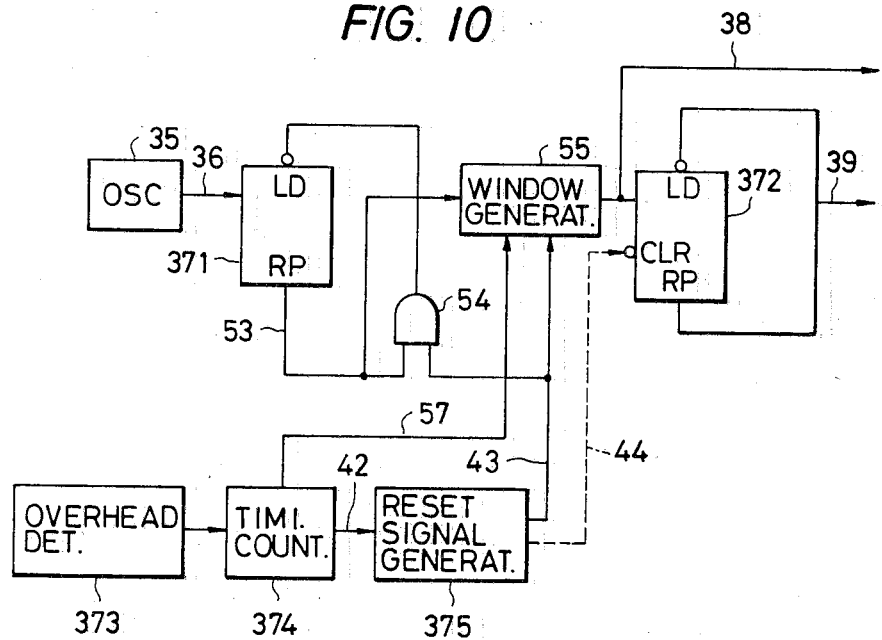
FIG. 10 is a block diagram showing a circuit for giving priority to the first reset signal.
Figure 11:
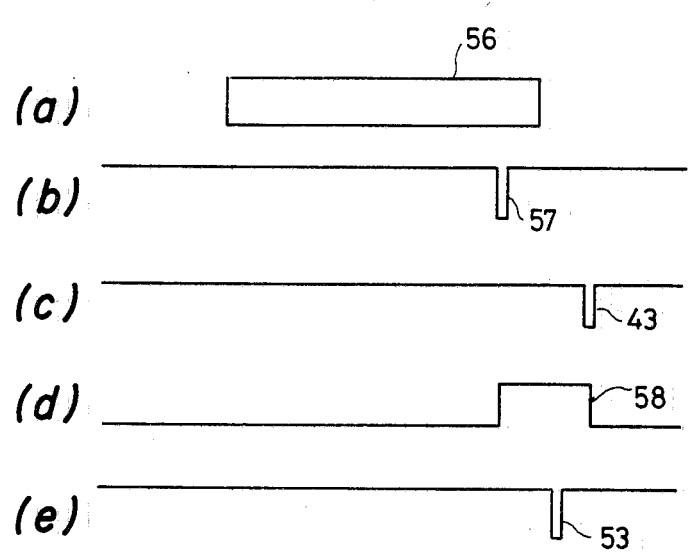
FIG. 11 is a waveform diagram showing various signals for a description of the circuit in FIG. 10.

In order to eliminate the above-described difficulty, a circuit as shown in FIG. 10 is provided. FIG. 10 shows a specific example of the block-diagrammatic circuit shown in FIG. 6. The first frequency-dividing circuit 371 subjects the clock signal 36 to frequency division by B and outputs a ripple carry 53. The ripple carry 53 is applied to one input terminal of a 2-input AND circuit 54 and a window generator 55. When a packet signal 56, shown as trace (a) of the timing diagram of FIG. 11, arrives from the master station, it is detected by the overhead detector 373 and the timing counter 374 starts counting. The timing counter 374 outputs a window setting signal 47, shown as trace (b) of FIG. 11, at the overhead following the data bit $b_6$ (hereinafter referred to as "the second overhead"). The window generator 55 produces a window signal 58 shown as trace (d) in FIG. 11 which falls in response to the window setting signal 57 and rises in response to the first reset signal 43, shown as trace (c) in FIG. 11.

When the window generator 55 receives the ripple carry 53 in a time zone in which the window 58 has been generated, the window generator will not output the ripple carry 53 as the block timing pulse. That is, in the case of a second group station, only after the packet signal of the master station is received is the first reset signal 43, delayed by the window generator, outputted as the block timing pulse 39. In the case of a first group station, the first reset signal 43 arrives earlier, and therefore the same result is obtained irrespective of the presence or absence of the window 58. The window setting signal 57 is formed by the circuit in FIG. 8. That is, when the first comparator 373A outputs the coincidence signal 47 at the end of the preamble $b_2$, a second overhead detecting counter 374A is enabled to start counting. In the communication system, the number of bits between the beginning of each packet signal and the second overhead is fixed. The second overhead detecting counter 374A outputs a ripple carry 61 when counting the number of bits between the beginning of the address bit $b_3$ and the end of the data bit $b_6$. The ripple carry 61 is applied to a flip-flop circuit 374B to set the latter, whereby the window setting signal 57 is provided at the output terminal $\overline{Q}$ thereof.

Figure 12:
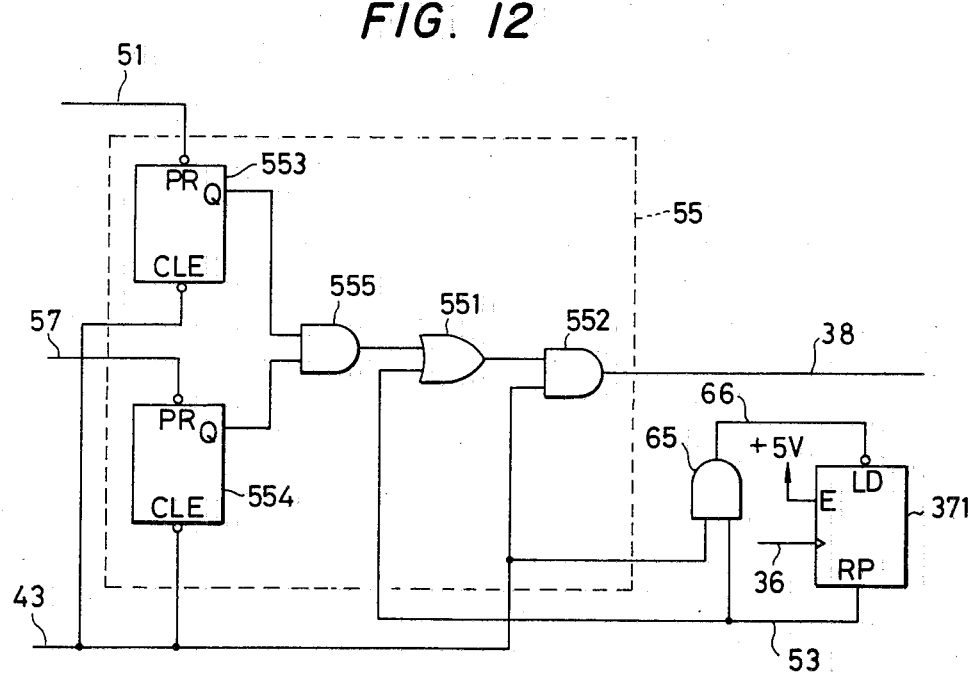
FIG. 12 is a block diagram showing a window generator mainly and its relevant essential parts for the aforementioned circuits.
Figure 13:
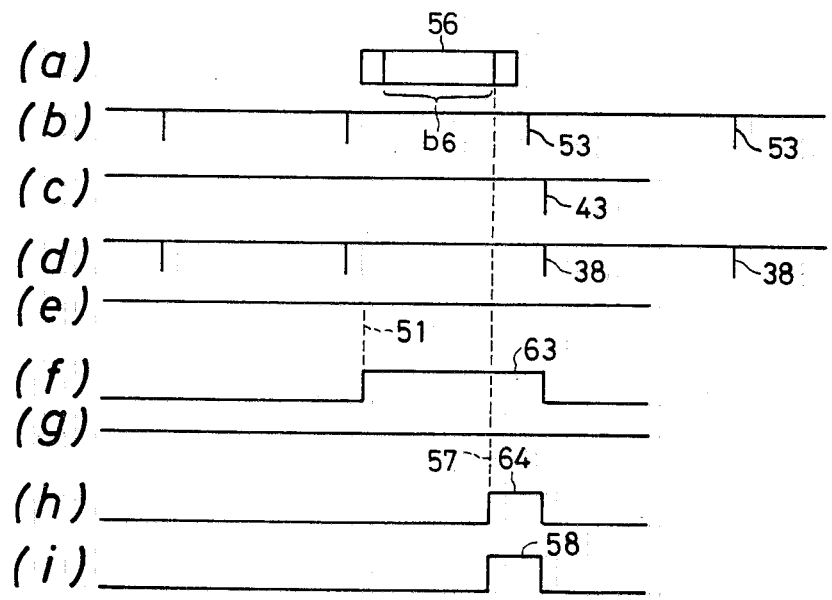
FIGS. 13 and 14 are waveform diagrams showing various signals for a description of the operation of the circuits in FIG. 12 for a station in the first and second groups, respectively.
Figure 14:
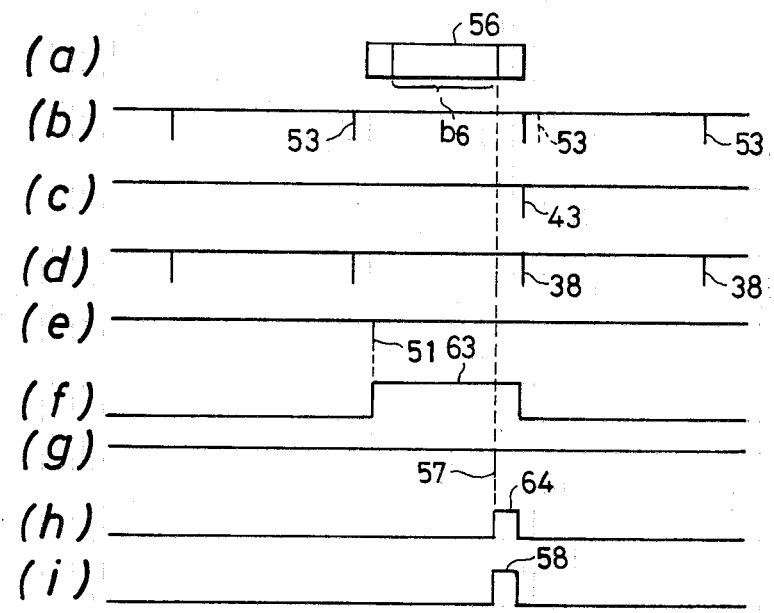

FIG. 12 is a block diagram showing the window generator and its relevant circuit elements in more detail. FIGS. 13 and 14 are waveform diagrams for a description of the operations of first and second group stations, respectively. Before a packet signal 56, shown as traces (a) of FIGS. 13 and 14, for either of the two groups arrives from the master station, a ripple carry 53, shown as traces (b) of FIGS. 13 and 14, which is obtained by frequency-dividing the clock signal 36 in the first frequency-dividing circuit 371 is supplied through an OR circuit 551 to a 2-input AND circuit 552 in the window generator 55. A first reset signal 43, shown as traces (c) in FIGS. 13 and 14, is applied to the other input terminal of the AND circuit 552. Under this condition, the first reset signal 43 is maintained at a high or inactive level. Accordingly, before the packet signal 56, shown as traces (a) in FIG. 13 and 14, of the master station is received, the same signal waveform as the ripple carry 53 is outputted as a block timing pulse 38, shown in traces (d) of FIGS. 13 and 14.

When the packet signal 56 of the master station is received, a low level master signal 51, shown in traces (e) of FIGS. 13 and 14, is produced whereupon a first flip-flop 553 is set to provide a high level master flag signal 63, shown in traces (f) of FIGS. 13 and 14, at its output terminal Q. Slightly later than this, i.e., when the second overhead of the packet signal 56 is received, a low level window setting signal 57, shown as traces (g) of FIGS. 13 and 14, is produced. As a result, a second flip-flop circuit 554 is set in order to provide a high level second overhead detection signal 64, shown in traces (h) of FIGS. 13 and 14, at the output terminal Q. The master flag signal 63 and the second overhead detection signal 64 last until the first and second flip-flop circuits 553 and 554 are cleared by the first reset signal 43.

An AND circuit 555 receives these signals 63 and 64, to output a window 58, as shown in traces (j) of FIGS. 13 and 14, which is applied to an OR circuit 551. Accordingly, when the ripple carry 53 is generated during production of the window 58, as shown in traces (b) of FIG. 14, it is disregarded. The AND circuit 552 which inputs the output of the OR circuit 551 with the timing of generation of the first reset signal 43 outputs a delaied block timing pulse 38. An AND circuit 65 for ANDing the first reset signal 43 and the ripple carry 53 outputs a load signal 66 with the timing of generation of the block timing pulse 38. The load signal 66 is applied to the load terminal LD of the first frequency dividing circuit 371, whereby the timing for outputting the ripple carry 53 is adjusted.

As is apparent from the above description, according to the invention, each station initializes or sets the initial value (timing edge) of the clock signal frequency divider by using the reset signal which is formed upon reception of the packet signal of the master station. Accordingly, not only can each station perform asynchronous operation, but also even when the master station is replaced, resetting the frame can be achieved by effecting frame synchronization with the aforementioned reset signal.

I claim:

1. A timing synchronizing circuit, for every station in a communication system comprising a plurality of stations and one master station, said master station being a reference station for system synchronization in an asynchronous transmission system, comprising:
   an oscillator in every station for producing a clock signal of a frequency substantially equal to those of other stations;
   a frequency divider in every station for frequency-dividing said clock signal, said frequency divider for each station defining frames and blocks within said frames, to format signal transmission between said stations;
   detecting means for detecting signals of block units transmitted from the master station;
   reset signal producing means for producing a reset signal, which defines a block start point of a block, from said signal being detected; and
   timing setting means for initializing said frequency divider with the said of said reset signal.

2. A timing synchronizing circuit, as recited in claim 1, further comprising:
   predicting means for allowing a station that is receiving signal transmission to predict a time zone in which said reset signal is produced.

3. A timing synchronizing circuit, as recited in claim 2, wherein a packet is formed by at least one of the generated blocks by equally dividing a frame which occurs periodically in time, and wherein said detecting means detects packets transmitted by said master station from control data included in said packet, and said predicting means predicts a time zone in which said reset signal is produced by said master station.

4. A timing synchronizing circuit, as recited in claim 3, wherein said time setting means allows said frequency divider to freely run when said reset signal is not produced, but is initialized by said reset signal in the time zone in which said reset signal is produced.

5. A timing synchronizing circuit as recited in claim 3 or 4, further comprising:
   a communication cable; and
   a plurality of taps on said communication cable that connect said stations to said communication cable.

6. A timing synchronizing circuit, as recited in claim 5, wherein whenever a packet is received in a station from said master station said reset signal producing means in that station identifies the position of said master station from control data included in said packet and thereafter sets the timing of generation of said reset signal according to the positional relation between said master station and the station receiving the transmission therefrom.

7. A timing synchronizing circuit, as recited in claim 5, wherein said frequency divider comprises a counter which operates synchronously with a clock signal and has a load terminal and a clear terminal, said frequency divider detecting a block and resetting a block.

8. A timing synchronizing circuit, as recited in claim 5, wherein said frequency divider comprises a counter which operates synchronously with a clock signal and has a load terminal and a clear terminal, said frequency divider detecting a frame and resetting a frame.

* * * * *